United States Patent

[11] 3,532,185

[72] Inventor Martin J. Sherry
 Dayton, Ohio
[21] Appl. No. 736,643
[22] Filed June 13, 1968
[45] Patented Oct. 6, 1970
[73] Assignee The Joyce-Gridland Company
 Dayton, Ohio
 a corporation of Ohio

[54] VEHICLE LIFT
 3 Claims, 12 Drawing Figs.

[52] U.S. Cl............................................. 187/8.74,
 187/8.52
[51] Int. Cl........................................... B66f 7/00
[50] Field of Search............................... 187/8.41,
 8.52, 8.74, 8.75

[56] References Cited
UNITED STATES PATENTS

| | | | |
|---|---|---|---|
| 3,233,767 | 2/1966 | Goodacre | 187/8.52 |
| 3,048,238 | 8/1962 | Wallace | 187/8.74 |
| 3,155,193 | 11/1964 | Racely | 187/8.74 |
| 3,375,905 | 4/1968 | Swick | 187/8.74 |

*Primary Examiner*—Harvey C. Hornsby
*Attorney*—Dybvig and Dybvig

ABSTRACT: Flip-up pads for a dimensionally fixed vehicle lift are automatically pivoted as the lift moves toward and away from the surrounding floor. Associated with each pad is a pivotal lever biased toward the floor and connected to the pad by a fixed linkage. The lever has one or more floor engaging roller elements for minimizing friction. Parts of the fixed linkage can be pre-set before assembly for accommodating different floor contours. In one embodiment, the pads are designed for use with, and specially located with respect to, a wheel locater plate for handling vehicles having different pickup points relative to the vehicle rear wheel.

Patented Oct. 6, 1970
3,532,185
Sheet 1 of 2
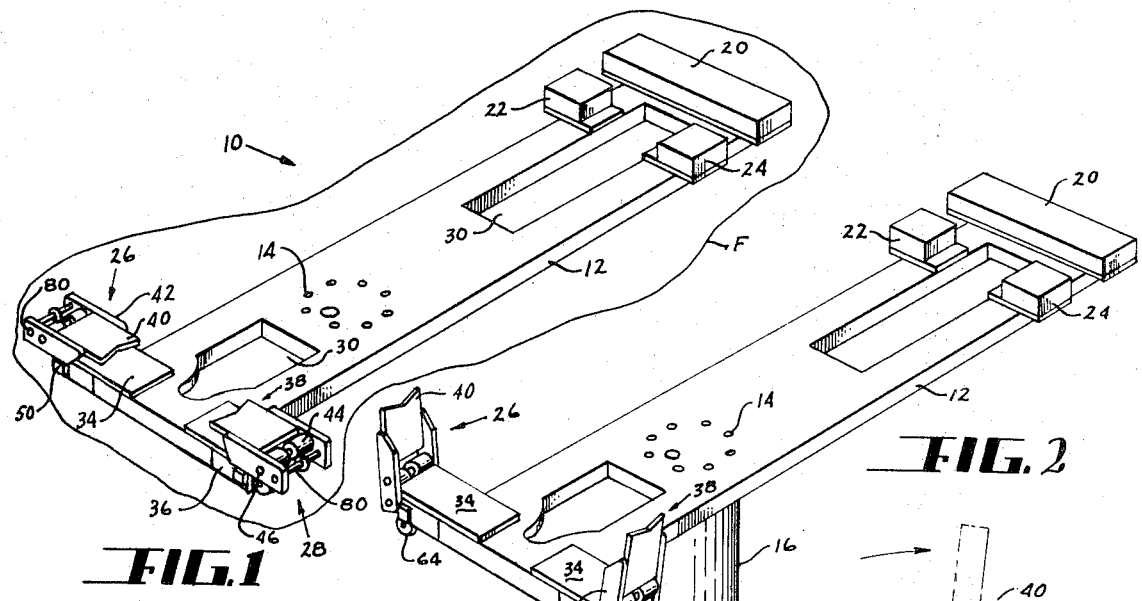
INVENTOR.
MARTIN J. SHERRY
BY
Dybvig and Dybvig
HIS ATTORNEYS

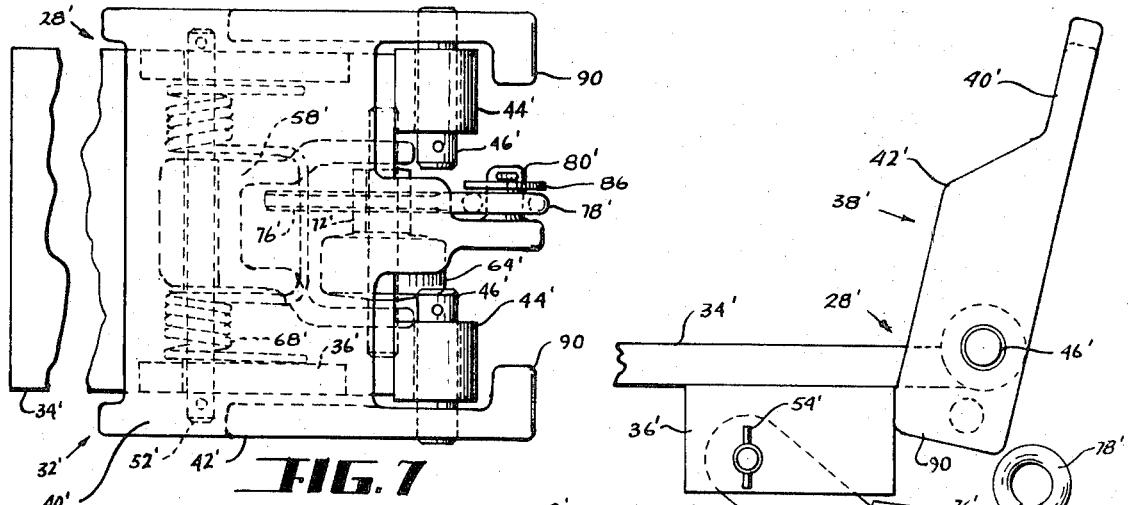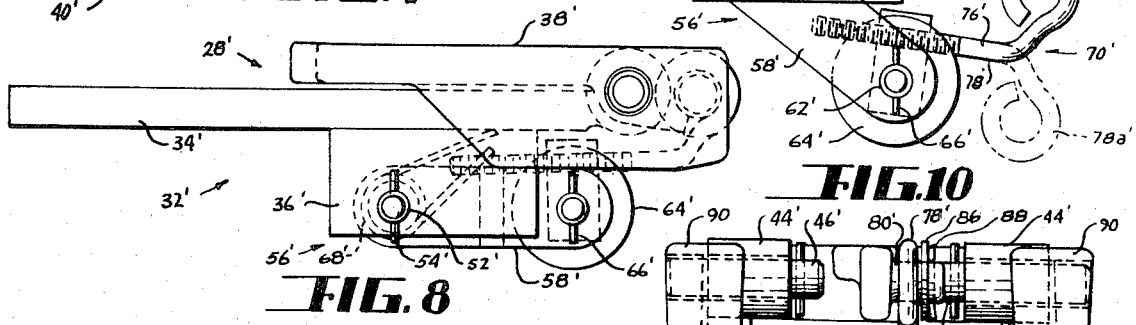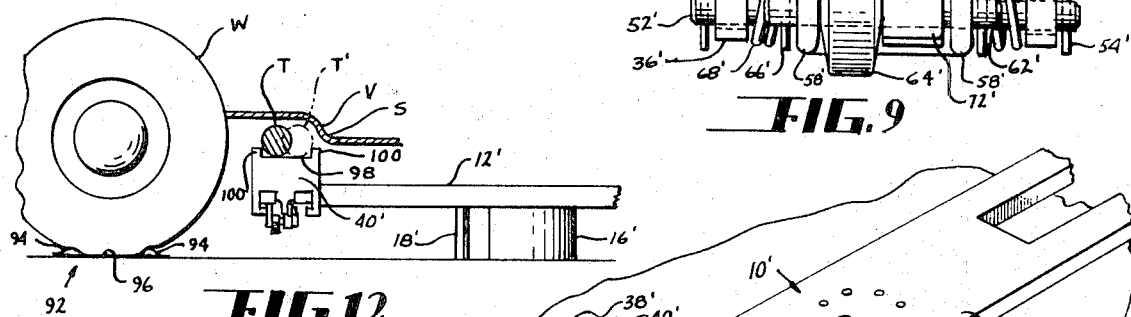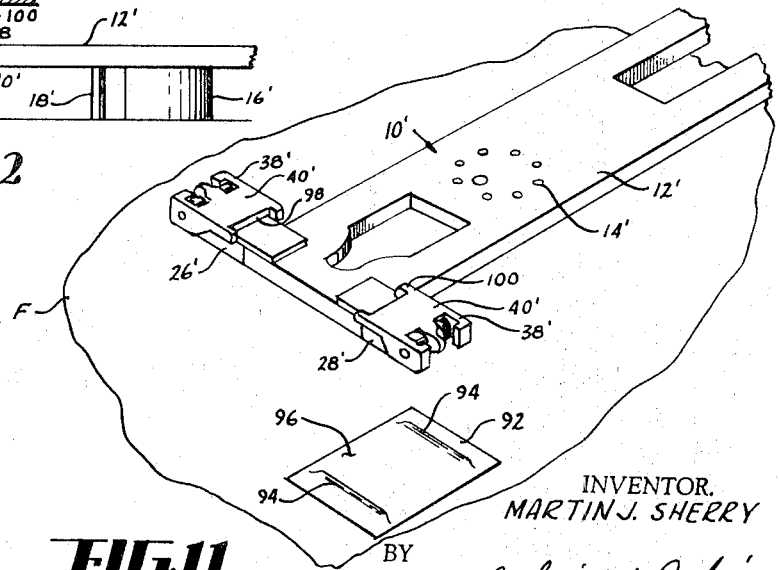

VEHICLE LIFT

This invention relates to a vehicle lift and more particularly to the type of vehicle lift having a superstructure of fixed dimensions and to flip-up pads therefor which automatically respond to the position of a vehicle lift relative to the surrounding floor.

Pivoted or hinged pads are conventionally used on many types of vehicle lifts and are practically required for lifts having a superstructure of fixed dimensions and designed especially for lifting small compact or foreign cars having pick-up points which are higher from the ground than other parts of the vehicle underbody.

Simple, manually pivoted pads are presently in common use. Manually pivoted pads suffer from the drawback that the person using the vehicle lift may neglect either to place the pads in an upright position before lifting the vehicle or return them to their lower, horizontal position after the vehicle is lowered. Also, and especially in those cases where the road clearance of the vehicle is minimal, the pivoting of the pads is an awkward, time-consuming task. To avoid these drawbacks, vehicle lifts have been marketed with pads which automatically respond to the position of the lift with respect to the floor. These pads, however, are either of a quite complicated and, therefor, expensive construction, or of an unreliable design. Some of the prior constructions have relatively adjustable parts for accommodating floor contours. A hazardous condition may result if the adjustment is changed during ordinary use of the lift.

A specialized type of vehicle lift having a superstructure of fixed dimensions is in common use today for raising one type of vehicle only. Thus, this type of lift has no slidable or otherwise horizontally adjustable vehicle engaging devices because the lift is intended solely for lifting one particular type of vehicle. The most common such lift is called the "Volkswagen lift" because it is used primarily in Volkswagen service centers for raising the various Volkswagen automobiles, all of which have had common pick-up points. When using the dimensionally fixed superstructure, the vehicle to be elevated is driven over the superstructure and one of its rear wheels located between ribs of a wheel locater plate which is so positioned with respect to the lift pick-up points that the automobile will, therefore, be properly oriented over the superstructure. Therefore, until recently, the lift mechanic was not concerned with positioning the vehicle engaging devices of the superstructure after driving the vehicle over the superstructure. Recently, the manufacturer of the Volkswagen automobile changed some of its models so that the longitudinal spacing between the rear wheels and the lift pick-up points on some older models is slightly different than it is on some newer models having the same body style. A mechanic using a conventional fixed dimension lift must now change the normal position of some of the newer vehicles' rear wheels with respect to the wheel locater plate. Because of the well-known similarities in design between various model years, it is apparent that a mechanic may, through mistake, improperly position a vehicle over the lift superstructure with the result that the vehicle might fall off the lift as it is being raised.

It is, accordingly, an object of this invention to provide a novel, simple and inexpensive pad assembly for a vehicle lift which responds to the position of the lift relative to the surrounding floor. In addition to a pivoted vehicle engaging pad, this invention includes a pivoted lever assembly biased into a generally vertical position which extends downwardly toward the floor and a connecting linkage between the lever assembly and the pad. When the lever assembly is engaged with the floor, the pad is in a generally horizontal position, but when the lever assembly is moved away from the floor as the lift rises, the extension of the lever assembly toward the floor causes the pad to move to its upright position.

A further object of this invention is to provide a connecting linkage between the lever assembly and the pad which may be easily pre-set to accommodate different floor contours and then easily assembled to reliably maintain the relative position of parts.

Another object of this invention is to provide a novel lift installation having a dimensionally fixed lift superstructure and a wheel locater plate for raising vehicle models having different longitudinal spacings between the rear wheels or axles thereof and the recommended pick-up points. With such a vehicle lift installation, the mechanic using the lift need not be concerned with minor differences in the lift models because the various models are all properly engaged by the lift pads if one of the vehicle rear wheels is properly positioned between the ribs or wheel locater surfaces of the wheel locater plate. This object is accomplished in accordance with this invention by slightly extending the effective vehicle engaging surface of the rear flip-up pads, without necessarily increasing the entire width thereof, and by positioning the wheel locater plate at an intermediate position between the optimum position it would occupy for use with either one of the different vehicle models. Further in this connection, the flip-up pads are provided with upwardly projecting lugs or ears which straddle the vehicle pick-up points to prevent accidental sliding of vehicles off these pads.

Other objects and advantages will become apparent from the following description. For example, it will be seen that the mechanisms of this invention are compactly organized such that they permit the lift to be lowered sufficiently that even cars having a minimum of road clearance can be driven over the lift and the mechanisms require no more floor space than is required by the simple, manually operated, flip-up pads.

Referring to the drawings:

FIG. 1 is a perspective view of one embodiment of a vehicle lift provided with pad assemblies in accordance with this invention shown in the position they would occupy when the lift is lowered;

FIG. 2 is a perspective view similar to FIG. 1 but showing the lift in a raised position and with the pads pivoted to their upright position;

FIG. 3 is a bottom perspective view of a portion of an underbody of a vehicle engaged by the pad assemblies provided by this invention;

FIG. 4 is a side elevational view of one of the pad assemblies as viewed from the end of the lift of FIGS. 1, 2 and 3;

FIG. 5 is a plan view of the underside of the assembly of FIG. 4;

FIG. 6 is a perspective view of a partially disassembled portion of the assembly of FIG. 4;

FIG. 7 is a plan view with parts broken away of a modified pad assembly made in accordance with this invention;

FIG. 8 is a side elevational view of the modification of FIG. 7;

FIG. 9 is an end elevational view of the modification of FIG. 7;

FIG. 10 is a side elevational view of a portion of the modified pad assembly with parts illustrated in a different position from that of FIG. 8 and also showing parts disassembled for use in presetting the pivotal response of the pad assembly;

FIG. 11 is a perspective view of a portion of a vehicle lift provided with modified pad assemblies of the type shown in FIGS. 7 through 10 and a wheel locater plate associated therewith; and FIG. 12 is a side elevational view of the portion of the lift installation of FIG. 11 and illustrating the manner in which the vehicle lift of FIG. 11 can be used to raise more than one type of vehicle.

This invention is disclosed in association with a vehicle lift of the type known as a Volkswagen lift because it is especially designed to lift small foreign vehicles, such as the vehicle V partially shown in FIG. 3, which have a transversely extending torsion tube or housing at their rear underbodies. The torsion housing in FIG. 3 is designated by the reference character T. As will become apparent, the invention may also be used with other types of vehicle lifts.

With reference to FIGS. 1, 2 and 3, the vehicle lift includes a superstructure 10 having a flat elongate bolster 12 connected by bolts 14 to the top of a piston 16 of a jacking unit which normally would include a cylinder (not shown) housed in a pit in the floor F. The bolster 12 is maintained in a predetermined alignment by a guide rod 18 connected to the bottom of the bolster 12 and slidable within an aperture in the floor F. Mounted on the bolster 12 are three front pads 20, 22 and 24 and two rear pad assemblies 26 and 28. The three front pads 20, 22 and 24 are located to engage appropriate pick-up points of different types of vehicles and may simply comprise wooden blocks attached in any suitable fashion to the top of the bolster 12. To increase the accessible work area on the underside of the vehicle being raised, the bolster 12 is provided with large apertures 30. Because the superstructure 10 has no slidable or otherwise horizontally movable parts which might be used to extend its reach, it is referred to as a superstructure having a fixed dimension herein.

The two rear pad assemblies 26 and 28 may be identically constructed. Hence, only the pad assembly 28 will be described in detail herein. However, some of the reference characters used in the following detailed description of the pad assembly 28 have been applied to the corresponding parts of the pad assembly 26. The pad assembly 28 includes a base member, generally designated 32, having a horizontal base plate 34 partially overlying the bolster 12 and parallel base side plates 36 depending from opposite margins of the bottom surface of the base plate 34 and abutted against the side of the bolster 12. It will be understood that the base member 32 would normally be welded to the bolster 12 but could be integral therewith.

A flip-up pad, generally designated 38, includes a pad plate 40 and depending parallel pad side plates 42 connected to the sides thereof and spaced to straddle the base member 32. The pad 38 is pivoted to the base member 32 by a hinge arrangement comprised of a pair of hinge knuckles or sleeves 44 welded to the end of the horizontal base plate 34 remote from the bolster 12 and a hinge pin 46 passing through the sleeves 44 and through aligned apertures in the pad side plates 42. The hinge pin 46 can be rather loosely received within the sleeves 44 and the apertures in the pad side plates 42. To prevent the pin 46 from becoming accidentally disassembled, a pair of spring roll pins 48 or the like are inserted in apertures therethrough immediately adjacent each of the hinge sleeves 44.

As apparent, the hinge arrangement 44, 46 permits the flip-up pads 38 to be freely pivoted about the axis of the hinge pin 46, which axis extends longitudinally of the superstructure 10. Thus the pad plate 40 may overlie the base member 34 in a generally horizontal position as shown in FIG. 1 or may be pivoted to an upright position as shown in FIG. 2. Pivotal movement of the pad 38 beyond the upright position shown in FIG. 2 is prevented by stop lugs 50 on the outer sides of the two base side plates 36 which are engaged, when the pad 38 is raised, by the adjacent surfaces of the pad side plates 42. For stability, the upright position of the pad 38 is slightly past vertical as illustrated by the broken line position 38a in FIG. 4.

Passing through aligned apertures in the base side plates 36 beneath the base plate 34 is a lever pivot pin 52 which is held therein by roll pins 54 or the like. A lever assembly 56, shown best in FIGS. 5 and 6, includes a pair of lever side plates 58 which are held in fixed, parallel, spaced relation by a spacer 60 welded thereto and which have aligned apertures at one end thereof receiving the lever pivot pin 52. The lever assembly 56 further includes a roller axle 62 which passes through aligned apertures in the other, free ends of the lever side plates 58 and a pair of roller elements 64 straddling the lever side plates 58 and mounted for rotation on the opposite ends of the roller axle 62. The roller axle 62 and the roller elements 64 are held in fixed relation on the side plates 58 by roll pins 66 or the like.

The lever assembly 56 is biased in a clockwise direction, as viewed in FIG. 4, about the axis of the lever pivot pin 52 by a torsion spring 68 having a U-shaped mid-portion 68a overlying the lever side plates 58 and end portions coiled about the pivot pin 52 and bearing against the underside of the base plate 34. Because the lever assembly 56 is so biased, the roller elements 64 tend to extend downwardly toward the floor F into the position shown in broken lines in FIG. 4 and in full lines in FIGS. 2 and 3. As should be obvious, when the superstructure 10 is fully lowered, the roller elements 64 are engaged by the floor and pivoted against the bias of the spring 68 into the full line position shown in FIG. 4. This is also the position shown in FIG. 1 but the roller elements 64 cannot be seen in FIG. 1 because they are confined between the base side plates 36 beneath the horizontal base plate 34.

Interconnecting the lever assembly 56 and the pad 38 is a connecting linkage 70 comprising an adjusting block 72 pivotally mounted on the roller axle 62 between the lever side plates 58 and further comprising an eye bolt 74 having a threaded shank portion 76 threadedly received in and passing through a threaded bore in the adjusting block 72 located between the roller axle 62 and the lever pivot pin 52. The eye bolt 74 has an eye portion 78 defining a bore through which a pivot pin 80 extends. The pivot pin 80 projects into aligned apertures in the pad side plates 42 by which it is mounted on the pad side plates 42 on an axis parallel to the axis of the hinge pin 46. To maintain the pivot pin 80 in a fixed position relative to the pad 38, a pair of cotter pins 82 are located immediately adjacent the confronting faces of the pad side plates 42.

The connecting linkage 70, because it is pivoted about both the pivot pin 80 and the roller axle 62, serves to transmit the pivotal movement of the lever assembly 56 to the pad 38. Accordingly, when the superstructure 10 is lowered so that the roller elements 64 engage the floor F and the entire lever assembly 56 is forced by the weight of the superstructure 10 against the bias of the spring 68 into the substantially horizontal, full line position shown in FIG. 4, the pad 38 is also pivoted to its horizontal position shown in full lines in FIG. 4. Likewise when the superstructure 10 is elevated and the lever assembly 56 pivoted by the spring 68 to cause the roller elements 64 to extend toward the floor F, the flip-up pad 38 is pivoted to its upright position.

It will be observed that the mechanism of this invention is quite simple and acts positively to automatically position the pad 38 both when the superstructure 10 is raised and when it is lowered. The use of the roller elements 64 minimizes wear due to friction when the lever assembly 56 slidably engages the floor F. By virtue of its compactness, and since none of the mechanism for automatically positioning the pad 38 projects beyond the side plates 42, the mechanism takes up no more floor space than a simple manually pivoted pad.

Sometimes a vehicle lift is located on a floor which slopes or has other irregularities resulting in the rear end of the bolster 12 being further from or closer to the floor than other portions of the underside of the bolster 12. It is necessary, therefore, that the mechanism automatically pivoting the pad 38 be capable of a pre-adjustment. Normally the adjustment need be made only when the lift is initially installed. Thereafter it should remain fixed. Such pre-setting is readily accomplished with the mechanism described above by removal of the cotter pins 82 whereupon the pivot pin 80 can be withdrawn from the eye portion 78 of the eye bolt 74. It is a simple matter then to change the length of the linkage 70 by rotating the eye bolt 74 to thread it further into or out of the threaded bore in the adjusting block 72. When reassembled, this change in the length of the linkage 70 results in a change in the separation of the pivot pin 80 and the roller axle 62. Disassembly and reassembly of these parts requires little time. Thereafter, unless these parts are again disassembled, the effective length of the linkage 70 remains fixed since the passage of the pivot pin 80 through the bore of the eye portion 78 prevents further rotation of the eye bolt 74.

Referring to FIGS. 7 through 12, a modified vehicle lift is illustrated having a superstructure 10' which is identical to the superstructure described above in connection with FIGS. 1 through 6 except in the construction of the rear flip-up pad assemblies designated 26' and 28' in FIGS. 7 through 12. Thus the superstructure 10' includes a bolster 12' mounted by bolts 14' on a vertically movable piston 16' and is guided in its vertical movement by a guide rod 18'. The superstructure 10' has front pads (not shown in FIGS. 7—12) which may be identical to the pads 20, 22 and 24 previously described.

The rear pad assembly 28' is illustrated in detail in FIGS. 7 through 10 and it will be understood that the pad assembly 26' is substantially identical thereto. The pad assembly 28' includes a base member 32' with a horizontal base plate 34' and base side plates 36' to which are welded a pair of hinge sleeves 44' receiving hinge pins 46' for the pivotal mounting of a flip-up pad 38'. The pivoted position of the flip-up pad 38' is responsive to the position of the lift superstructure 10' relative to the floor F and for this purpose a lever assembly 56' is pivotally mounted upon the base side plates 36' by a lever pivot pin 52'. A pair of roll pins or the like 54' straddling the base side plates 36' pass through the ends of the pivot pin 52'. The lever assembly 56' comprises a pair of lever side plates 58' mounted at one end on the lever pivot pin 52' and a single roller element 64' rotatably mounted on a roller axle 62' journalled in the free ends of the lever side plates 58'. Mounted adjacent the roller 64' on the roller axle 62' is an adjusting block 72' having an aperture therein threadedly receiving an eye bolt 74' comprising a shank portion 76' and an eye portion 78'. Roll pins 66' or the like maintain the roller axle 62' in assembled relation with the roller 64' and the adjusting block 72'. When the pad assembly 28' is assembled, the eye portion 78' is connected to the flip-up pad 38' and for this purpose encircles a horizontally protruding stub pivot pin portion 80' which is integral with the flip-up pad 38'. The eye portion 78' is held in assembled relation on the stub pin portion 80' by a washer 86 and a cotter pin 88. As in the pad assemblies described above, the adjusting block 72' and the eye bolt 74' comprise a connecting linkage, generally designated 70', for interconnecting the lever assembly 56' and the flip-up pad 38'.

The operation of the pad assembly 28' of FIGS. 7 through 12 is identical to the operation of the pad assemblies described above. When the lift superstructure 10' of FIGS. 7 through 12 is elevated, the lever assembly 56' is biased in a counter-clockwise direction as viewed in FIG. 8 by a torsion spring 68' bearing against the bottom face of the horizontal base plate 34' and against the top surface of the lever side plates 58'. Portions of the torsion spring 68' are coiled about the lever pivot pin 52' and the spring 68' is confined between the base side plates 36'. The flip-up pad 38' includes a pad plate 40' and pad side plates 42' which straddle the base member 32'. The flip-up pads 38 illustrated in FIGS. 1 through 6 are conveniently of a welded construction whereas the flip-up pads 38' of FIGS. 7 through 12 can conveniently be castings. Integral with the ends of the pad side plates 42' opposite the vehicle engaging surface of the flip-up pad 38' are a pair of mutually confronting flanges 90 which abut against the rear edges of the base side plates 36' and serve as stops when the flip-up pad 38' is pivoted to its generally upright position.

The effective length of the connecting linkage 70' can be adjustably pre-set because of the threaded engagement between the eye bolt shank portion 76' and the adjusting block 72'. As best shown in FIG. 10, the end of the shank portion 76' adjacent the eye portion 78' is bent upwardly such that the longitudinal axis of the shank portion 76' does not pass through the eye portion 78'. Accordingly, if the washer 86 and the cotter pin 88 are removed, the eye portion 78' can be rotated about the longitudinal axis of the shank portion 76' and thereby removed from the stub pin portion 80'. The broken lines 78a' in FIG. 10 represent the position of the eye portion 78' when it has been rotated through 180°. Thus, assembly of the eye bolt 74' to the flip-up pad 38' is simpler in the embodiment shown in FIGS. 7 through 12 than it is in the embodiment shown in FIGS. 1 through 6. In both cases, however, it should be observed that some disassembly is required in order to change the effective length of the connecting linkage 70'. Since disassembly is required, the adjustment, once pre-set, will not change through ordinary use of the lift. This has a distinct advantage over lifts having adjustable pad pivoting mechanisms which can fall out of adjustment. Of course, a hazardous condition may arise if the adjustment accidentally changes.

Referring to FIGS. 11 and 12, a lift installation is shown including the lift superstructure 10' having the pad assemblies 26' and 28' and further including a wheel locater plate 92 which has upwardly projecting, parallel, transversely extending and longitudinally spaced wheel locater ribs 94 defining therebetween a wheel receiving surface portion 96. FIG. 12 shows a vehicle wheel W appropriately positioned on the surface 96. As already mentioned, fixed dimension lifts are normally used to engage and elevate a limited number of types of vehicles and a fixed dimension lift of the type disclosed herein has been used only to lift vehicles having a common longitudinal spacing between the centerline of the rear wheels and the vertical centerline of the manufacturers recommended pick-up points. Typically such lifts have had flip-up pads which have notched or V-shaped vehicle engaging surfaces when used to engage a vehicle such as the vehicle V along the torsion housing T. To properly engage a torsion housing or other pick-up point which is spaced differently from the vertical centerline of the rear wheels than the spacing for which the lift installation is designed, the mechanic using the lift would have to position the vehicle rear wheel W at a different location relative to the wheel locater plate 92. There is a great likelihood of human error under these circumstances.

In accordance with this invention, the pad assemblies 26' and 28' and the wheel locater plate 92 are designed and relatively positioned to engage different vehicles having a different spacing between the rear wheels and torsion housings or other pick-up points without changing the location of the vehicle rear wheel relative to the wheel locater plate 92. Thus, as best seen in FIGS. 11 and 12, the vehicle engaging top surface of each pad plate 40' has an elongate, longitudinally extending planar surface portion 98 and a pair of upwardly extending studs 100 located at the longitudinal extremities of the planar surface portion 98. In FIG. 12 the torsion housing T is shown supported by one of the planar surfaces 98 closely adjacent to the rearmost stud 100. A torsion housing T' is shown in dotted lines in FIG. 12 which is closer to the foremost stud 100, the dotted line torsion housing T' being illustrative of the torsion housing of a vehicle having a larger longitudinal spacing between the rear wheels and the torsion housing than is the corresponding separation of the torsion housing T and the wheel W shown in full lines. As apparent from FIG. 12, neither the torsion housing T nor the torsion housing T' is centered on the planar surface 98. This results from the unique positioning of the wheel locater plate 92. If the wheel locater plate 92 were positioned such that, with the vehicle wheel W properly supported thereon, its associated torsion housing T would be centered on the pad plate 40', the pad plate 40' would be incapable of safely engaging the torsion housing T' of a vehicle having a slightly different separation between its rear wheels and its torsion housing. As is often the case, the underbody of the vehicle V shown in FIG. 12 has a surface portion, designated S, closely adjacent each pick-up point which limits the width of the pad assemblies useful for raising the vehicle. In other words, every effort is made to minimize the widths of the flip-up pads. To accommodate both the longer and the shorter dimensioned vehicles, the transverse centerline of the wheel locater plate 92 is located midway between the optimum position it would occupy for raising vehicles having different spacings between the torsion housings and the rear wheels. Of course, the lift installation shown in FIGS. 11 and 12 could successfully and safely be used for raising vehicles having any such spacing intermediate the maximum and minimum spacings for which the installation is designed.

To further explain the proper positioning of a wheel locater plate in accordance with this invention, a typical lift installation, such as shown in FIGS. 11 and 12, is designed for use with models of vehicles having a separation between the centerlines of their wheels and their torsion housings of 16 inches and for use with other models of vehicles having a separation between the wheels and the torsion housings of 17½ inches. The wheel locater plate 92 is thus positioned such that the centerline of its wheel receiving surface portion 96 is spaced from the centerline of the rear pad plates 40' by 16¾ inches. The width of each flip-up pad is is 5-1/16 inches and the width of the vehicle engaging surface thereof 4-3/16 inches. If the wheel locater plate 92 is positioned as indicated to satisfactorily locate the torsion housing or other pick-up points over the rear pad assemblies, there typically is no difficulty in properly engaging the front ends of all vehicles to be raised because of the normally wide construction of the pads 20, 22 and 24.

Because of the criticality of the position of a vehicle over a vehicle lift having notched or grooved pads, fixed dimension lift installations have normally had two, symmetrically disposed wheel locater plates, one on each side of the rear of the lift. Using the pad assemblies 26' and 28' it would not be as essential to have two wheel locater plates. However, it is to be understood that the installation shown in FIGS. 11 and 12, for purposes of increased safety, could have two such plates, both being identical to the plate 92 illustrated in FIGS. 11 and 12. Since the transverse centerlines of both pad assemblies 26' and 28' are aligned, the two wheel locater plates would be positioned symmetrically with respect to the longitudinal centerline of the lift installation with their transverse centerlines also in alignment.

I claim:

1. In a vehicle lift of the type movable up and down relative to a floor for raising and lowering a vehicle, a generally horizontal base member, a vehicle engaging pad mounted on said base member for pivotal movement about a first horizontal axis from a generally horizontal position to a generally upright vehicle engaging position, a pivot pin fixed to said base member on a second horizontal axis spaced from said first horizontal axis, a lever assembly including antifriction means engageable with the floor and a member carrying said antifriction means, said lever assembly being located beneath said base member and having an end portion pivotally mounted on said pivot pin for pivotal movement about said second horizontal axis a torsion spring partially coiled about said pivot pin coacting between said base member and said lever assembly and engaging said lever assembly for biasing said lever assembly into a generally vertical position in which said second end portion extends downwardly toward the floor whereby said level assembly pivots about said second horizontal axis as said base member moves toward and away from the floor, and a connecting linkage interconnecting said lever assembly and said pad causing said pad to pivot about said first horizontal axis as said lever assembly pivots about said second horizontal axis, said connecting linkage including an an adjusting piece pivotally mounted on said lever assembly by said member carrying said antifriction means and an eye bolt having a shank portion threadedly connected with said adjusting piece for rotation of said eye bolt and having an eye portion rotatably received upon a shaft member on said pad for rotation about a horizontal axis but preventing substantial rotation of said eye bolt about the axis of threaded engagement of said shank portion with said adjusting piece.

2. The structure of claim 1 wherein said member carrying said antifriction means includes a roller axle parallel to said second horizontal axis, said antifriction means including at least one roller element mounted on said roller axle and engageable with the floor, and wherein said roller axle passes through a bore in said adjusting piece for pivotally mounting said adjusting piece on said lever assembly.

3. The structure of claim 1 wherein said shaft member is a stub shaft fixed in relation to said pad, said eye bolt removably receiving said stub shaft, and wherein said eye bolt has a bent shank portion whereby said eye bolt may be rotated to remove its eye portion from said stub shaft to change its threaded connection to said adjusting block.